(12) United States Patent
Kakimi et al.

(10) Patent No.: US 10,756,458 B2
(45) Date of Patent: Aug. 25, 2020

(54) BUS BAR ASSEMBLING STRUCTURE, ELECTRICAL CONNECTION BOX AND WIRE HARNESS

(71) Applicant: YAZAKI CORPORATION, Tokyo (JP)

(72) Inventors: Takaaki Kakimi, Makinohara (JP); Tatsuhiko Ikeda, Makinohara (JP); Tetsuya Kato, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/596,719

(22) Filed: Oct. 8, 2019

(65) Prior Publication Data

US 2020/0153128 A1 May 14, 2020

(30) Foreign Application Priority Data

Nov. 12, 2018 (JP) .................................. 2018-211955

(51) Int. Cl.
| | |
|---|---|
| *H01R 9/24* | (2006.01) |
| *H01R 9/16* | (2006.01) |
| *B60R 16/023* | (2006.01) |
| *B60R 16/02* | (2006.01) |
| *H02G 3/08* | (2006.01) |

(52) U.S. Cl.
CPC ........... *H01R 9/24* (2013.01); *B60R 16/0215* (2013.01); *B60R 16/0238* (2013.01); *H01R 9/16* (2013.01); *H02G 3/081* (2013.01)

(58) Field of Classification Search
CPC ........ H01R 9/24; H01R 9/16; B60R 16/0215; B60R 16/0238; H02G 3/081

USPC ......................................................... 439/709
See application file for complete search history.

(56) References Cited

U.S. PATENT DOCUMENTS

| | | | | |
|---|---|---|---|---|
| 7,566,249 | B2 * | 7/2009 | Okada ................... | H05K 7/026 |
| | | | | 439/709 |
| 8,907,213 | B2 * | 12/2014 | I .......................... | B60R 16/0238 |
| | | | | 174/50 |
| 9,496,693 | B2 * | 11/2016 | Maebashi ............. | H05K 5/0052 |
| 9,578,774 | B2 * | 2/2017 | Nakashima ........... | H05K 7/026 |
| 9,623,816 | B2 * | 4/2017 | Maebashi ........... | B60R 16/0238 |
| 9,699,919 | B2 * | 7/2017 | Maebashi ............ | H05K 3/3447 |
| 9,758,115 | B2 * | 9/2017 | Maebashi ........... | B60R 16/0238 |
| 10,063,041 | B2 * | 8/2018 | Maebashi ............. | H02G 3/088 |

(Continued)

FOREIGN PATENT DOCUMENTS

JP          2018-64366 A          4/2018

*Primary Examiner* — Abdullah A Riyami
*Assistant Examiner* — Vladimir Imas
(74) *Attorney, Agent, or Firm* — Kenealy Vaidya LLP

(57) ABSTRACT

A bus bar assembling structure includes a resin block main body for an electronic component block, a first bus bar, and a second bus bar. The resin block main body includes a bus bar assembling portion. The first bus bar and the second bus bar are accommodated in the bus bar assembling portion. The first bus bar has a first pushing portion that is pushed when the first bus bar is accommodated in the bus bar assembling portion, the first pushing portion being a bent piece. The first pushing portion has a through hole or a notch. The second bus bar has a second pushing portion that is inserted into the through hole or the notch and is disposed at a position corresponding to a position of a pushed surface of the first pushing portion.

5 Claims, 9 Drawing Sheets

(56) References Cited

U.S. PATENT DOCUMENTS

| | | | |
|---|---|---|---|
| 2002/0157848 A1* | 10/2002 | Chiriku | B60R 16/0238 174/50 |
| 2003/0188882 A1* | 10/2003 | Asao | H01R 13/4538 174/541 |
| 2011/0136377 A1* | 6/2011 | Ikeda | B60R 16/0238 439/540.1 |
| 2012/0043104 A1* | 2/2012 | Takeuchi | H02B 1/052 174/50 |
| 2018/0342860 A1* | 11/2018 | Hasegawa | H02G 3/081 |
| 2020/0153151 A1* | 5/2020 | Ikeda | H01R 13/518 |

* cited by examiner

BUS BAR ASSEMBLING STRUCTURE, ELECTRICAL CONNECTION BOX AND WIRE HARNESS

CROSS REFERENCE TO RELATED APPLICATIONS

This application is based on Japanese Patent Application (No. 2018-211955) filed on Nov. 12, 2018, the contents of which are incorporated herein by reference.

BACKGROUND OF THE INVENTION

1. Field of the Invention

The present invention relates to a bus bar assembling structure employed in an electronic component block. The present invention also relates to an electrical connection box including an electronic component block. The present invention further relates to a wire harness including an electrical connection box at a terminal.

2. Background Art

An electrical connection box mounted on an automobile is configured to include an electronic component block and a housing that accommodates the electronic component block (for example, see JP-A-2018-64366). The housing is configured to include a frame whose upper and lower sides are opened, an upper cover that covers an upper opening of the frame, and a lower cover that covers a lower opening of the frame. Bus bar assembling portions are formed in a resin block main body constituting the electronic component block. The bus bar assembling portion is formed as an assembling portion of a bus bar. The bus bar assembling portion includes a bus bar accommodating groove having a groove shape as viewed from a lower surface side of the block main body. A bus bar locking portion is formed in the bus bar assembling portion so that the bus bar does not fall off. The bus bar includes a bus bar main body accommodated in the bus bar accommodating groove, and electrical connection portions continuous with the bus bar main body. The electrical connection portions are disposed and formed in alignment with a plurality of cavities in the block main body. The electrical connection portions are disposed and formed at both ends of the bus bar main body in a longitudinal direction.

In the related art, a plurality of bus bars are provided, and the plurality of bus bars are assembled to corresponding bus bar assembling portions one by one. In other words, assembling is required depending on the number of the bus bars. It can be said that the workability is low during the assembling depending on the number of the bus bars.

SUMMARY OF THE INVENTION

The present invention has been made in view of the above circumstances, and an object thereof is to provide a bus bar assembling structure capable of improving the workability of assembling the bus bars. Another object of the present invention is to provide an electrical connection box or a wire harness that employs the bus bar assembling structure.

According to a first aspect of the present invention made to solve the above problems, there is provided a bus bar assembling structure including: a resin block main body for an electronic component block, a first bus bar, and a second bus bar. The resin block main body includes a bus bar assembling portion. The first bus bar and the second bus bar are accommodated in the bus bar assembling portion. The first bus bar has a first pushing portion that is pushed when the first bus bar is accommodated in the bus bar assembling portion, the first pushing portion being a bent piece. The first pushing portion has a through hole or a notch. The second bus bar has a second pushing portion that is inserted into the through hole or the notch and is disposed at a position corresponding to a position of a pushed surface of the first pushing portion.

According to the present invention having the feature of the first aspect, since the second pushing portion of the second bus bar is disposed at the position corresponding to the position of the pushed surface of the first pushing portion in the first bus bar, the first bus bar and the second bus bar can be collectively assembled in the bus bar assembling portion by pushing the first pushing portion and the second pushing portion simultaneously at the same position. According to the present invention, the assembling that is required twice according to the example in the related art is completed only once, so that the workability can be improved.

According to a second aspect of the present invention, in the bus bar assembling structure according to the first aspect, the first pushing portion is formed in a strip plate shape extending along the longitudinal direction of the first bus bar.

According to the present invention having the feature of the second aspect, since the pushed surface of the first pushing portion is enlarged, pushing can be easily performed. In addition, since the first pushing portion is enlarged, the enlarged first pushing portion can be utilized as a portion for heat dissipation. In other words, the first pushing portion can have a function as a heat dissipating portion.

According to a third aspect of the present invention, in the bus bar assembling structure according to the first or second aspect, the first pushing portion is the notch, and the second pushing portion is formed in a shape of a narrow bent piece extending along an extending direction of the notch.

According to the present invention having the feature of the third aspect, a pushed surface of the second pushing portion can also be enlarged, so that the workability can be improved.

According to a fourth aspect of the present invention made to solve the above problems, there is provided an electrical connection box including: an electronic component block that includes the bus bar assembling structure according to the first, second or third aspects, and a housing that accommodates the electronic component block According to the present invention having the feature of the fourth aspect, a better electrical connection box can be provided due to the electronic component block having a structure that improves the workability of assembling the bus bars.

According to a fifth aspect of the present invention made to solve the above problems, there is provided a wire harness including: a wire harness body whose end portion is connected to the electrical connection box according to the fourth aspect. The wire harness body is routed in an automobile.

According to the present invention having the feature of the fifth aspect, a better wire harness can be provided due to the electrical connection box having a structure that improves the workability of assembling the bus bars.

According to the bus bar assembling structure of the present invention, the first bus bar and the second bus bar can be collectively assembled to the bus bar assembling portion of the block main body, so that the workability can be improved compared with the example in related art. In addition, according to the electrical connection box or the wire harness of the present invention, a better product can be provided due to the bus bar assembling structure having the above effect.

DESCRIPTION OF EMBODIMENTS

A wire harness routed in an automobile includes an electrical connection box at a terminal thereof. The electrical connection box is configured to include an electronic component block in which a plurality of electronic components are assembled, and a housing to which the electrical component block is assembled. A bus bar assembling portion is formed in a resin block main body constituting the electronic component block. A first bus bar and a second bus bar are accommodated in the bus bar assembling portion. The first bus bar is formed in a shape in which a first pushing portion that is pushed when being accommodated to the bus bar assembling portion is a bent piece. A through hole or a notch is formed in the first pushing portion. On the other hand, a second pushing portion that is inserted into the through hole or the notch and is disposed in accordance with a position of a pushed surface of the first pushing portion is formed in the second bus bar.

Embodiment

Figure 1:
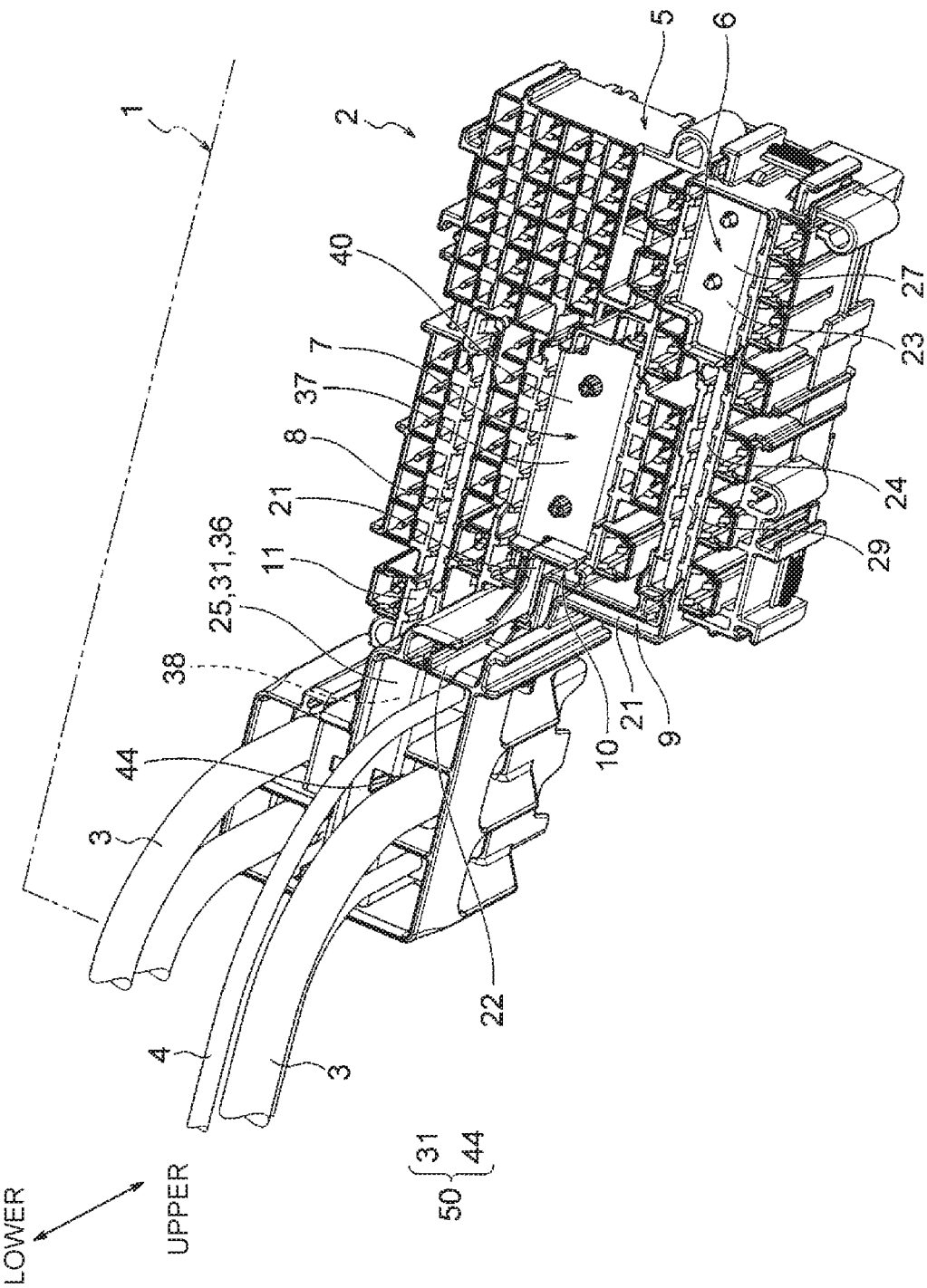
FIG. 1 is a perspective view (a perspective view as viewed from a bottom side) showing an embodiment of an electronic component block having a bus bar assembling structure according to the present invention.
Figure 2:
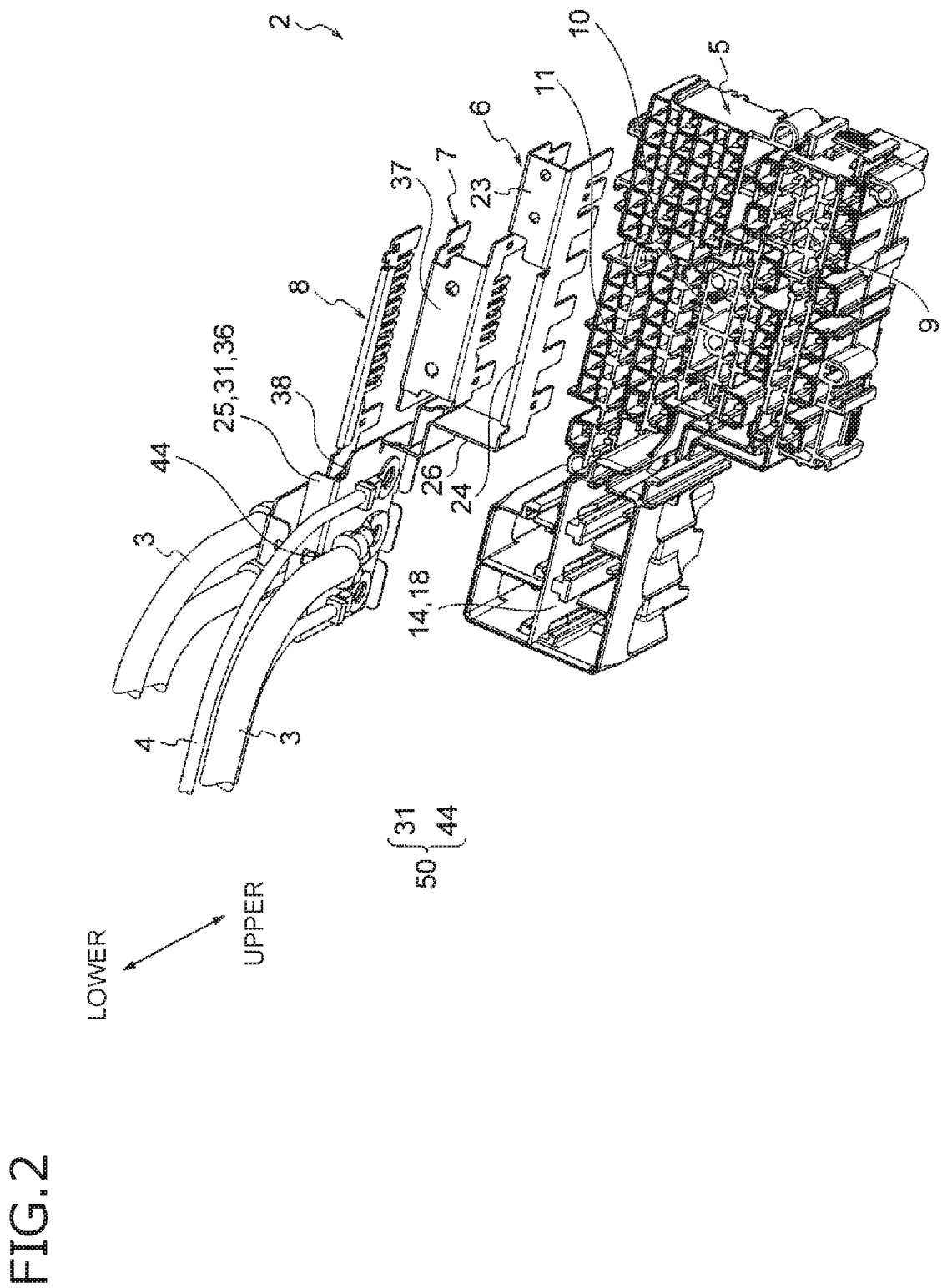
FIG. 2 is an exploded perspective view of a configuration in FIG. 1.
Figure 3:
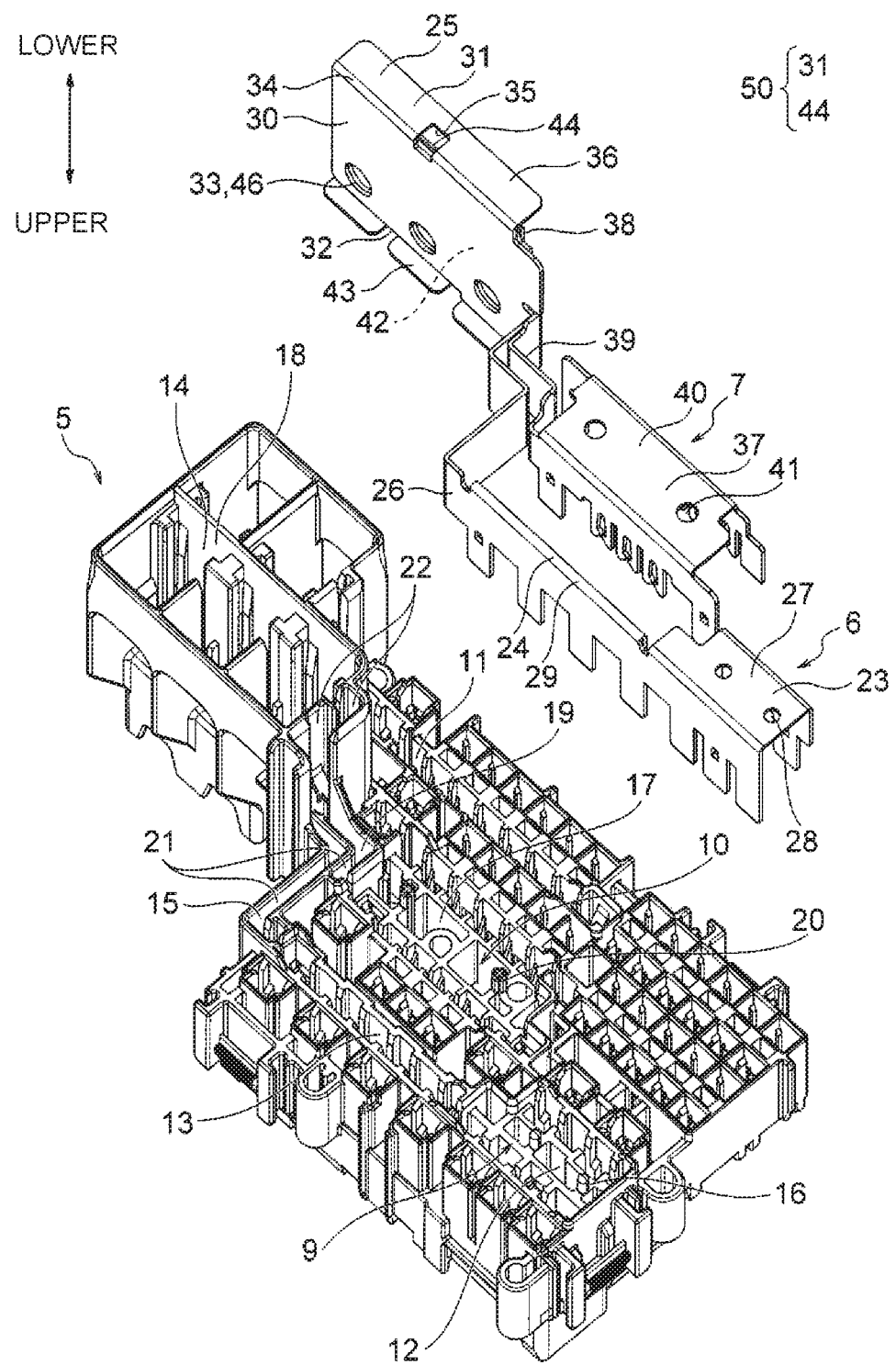
FIG. 3 is an exploded perspective view of configurations of a block main body, a first bus bar and a second bus bar.
Figure 4:
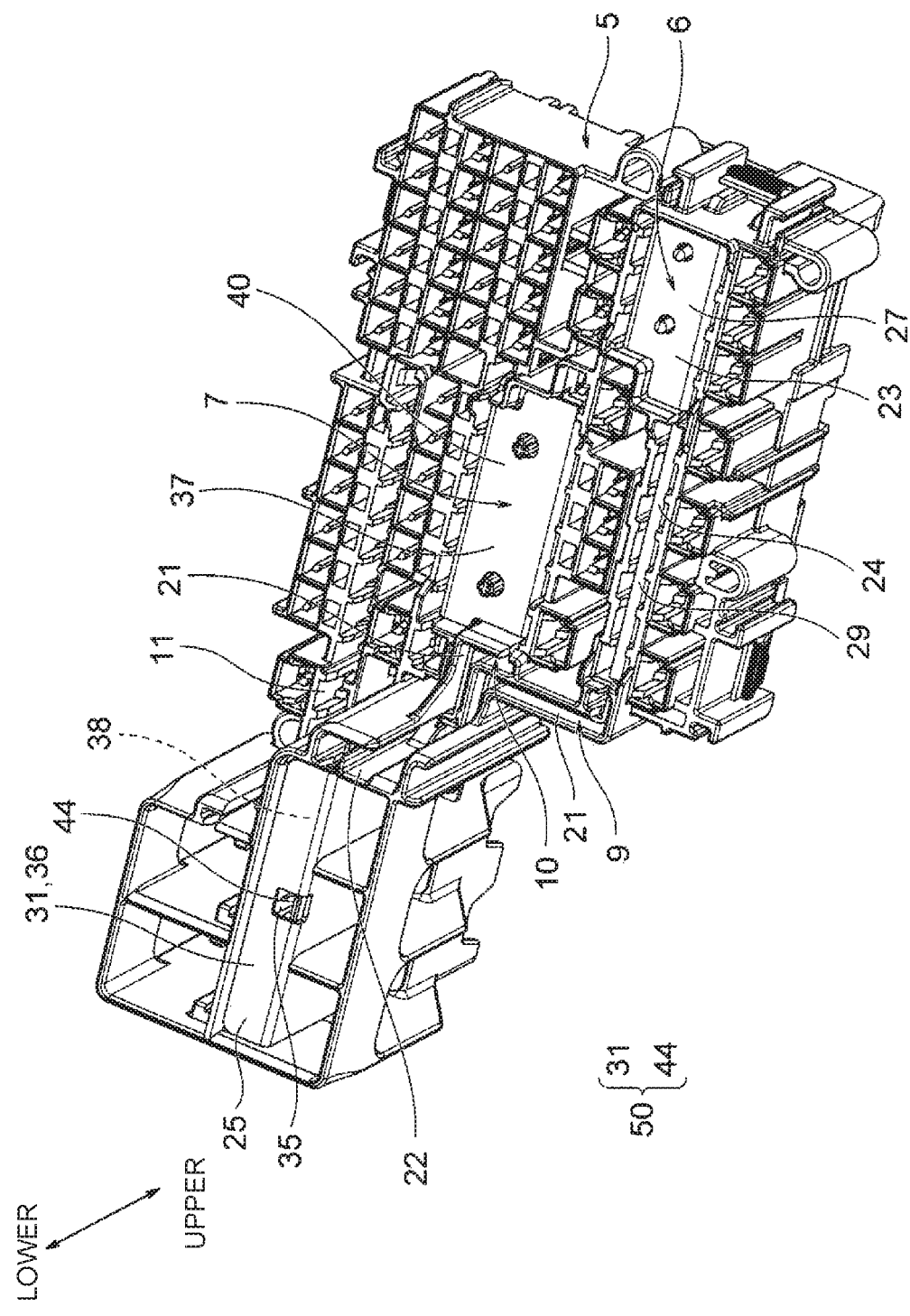
FIG. 4 is a perspective view showing a state in which the first bus bar and the second bus bar having the configurations in FIG. 3 are assembled to the block main body.
Figure 5:
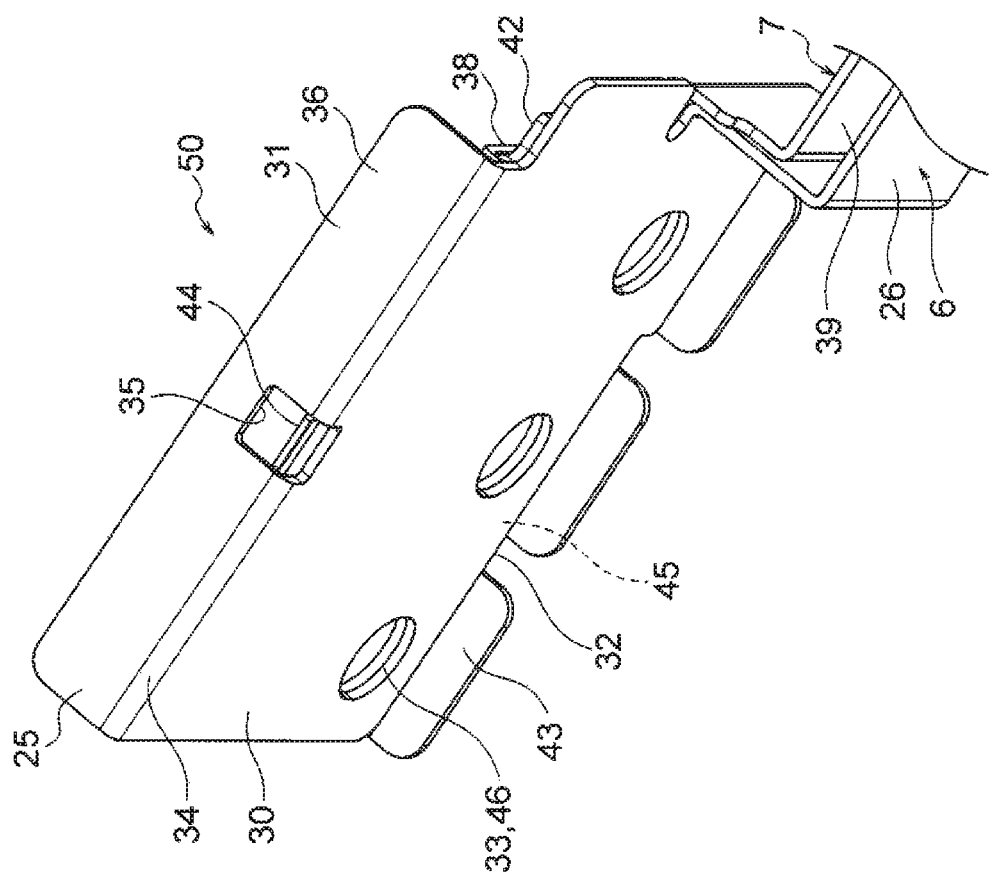
FIG. 5 is a perspective view showing main portions of the first bus bar and the second bus bar.
Figure 6:
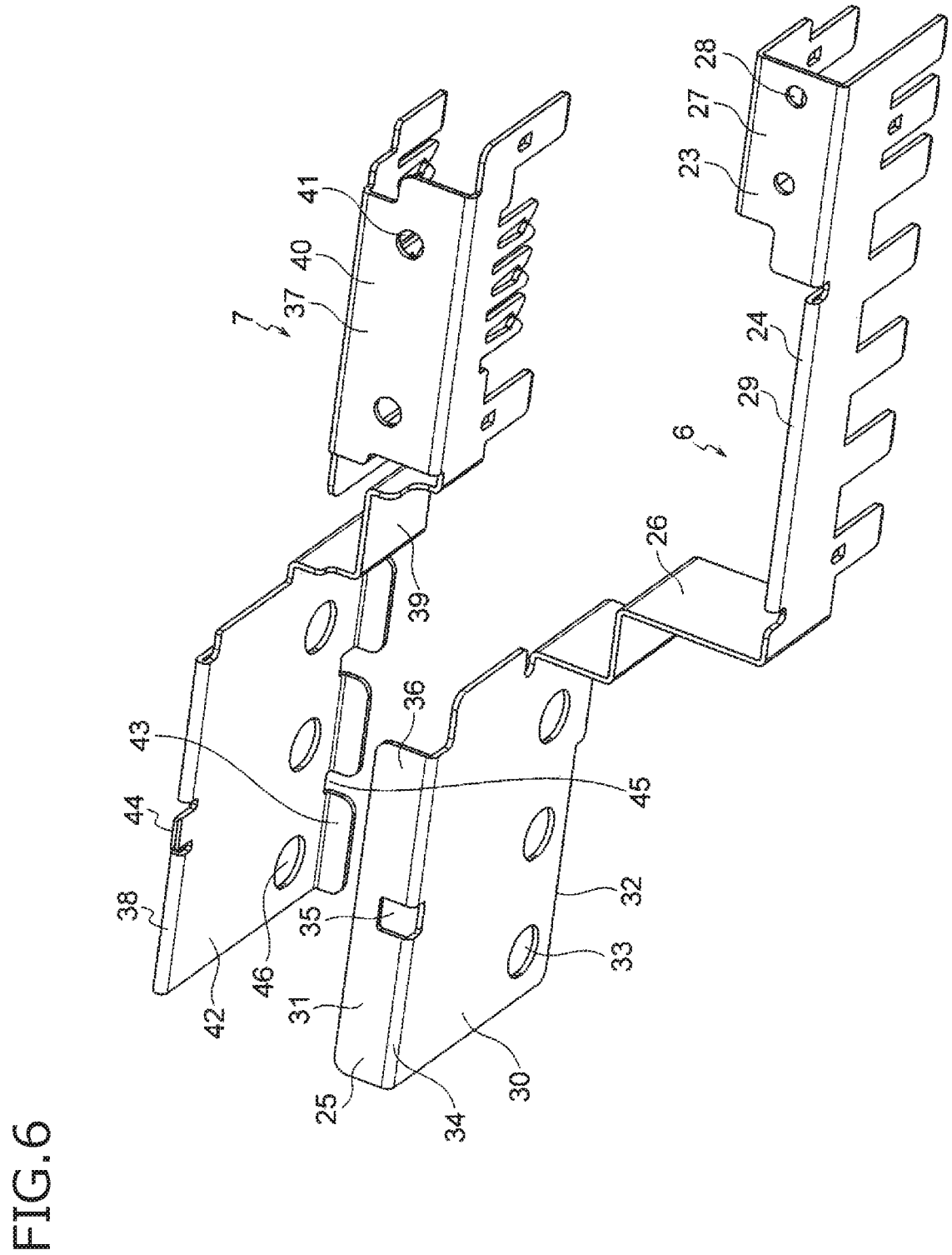
FIG. 6 is a perspective view showing the first bus bar and the second bus bar before assembling.
Figure 7:
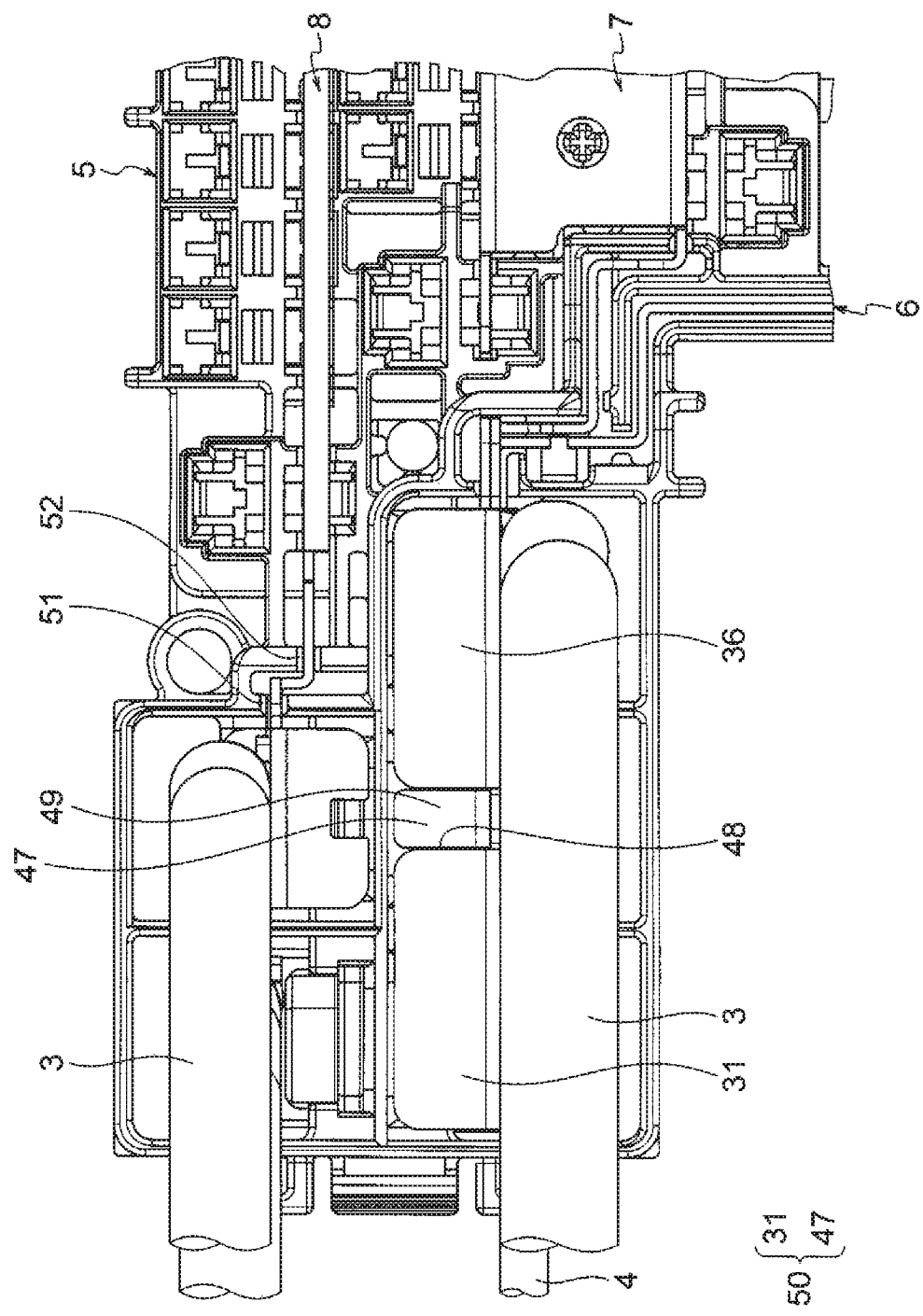
FIG. 7 is a bottom view of an electronic component block showing a modification of a first bus bar and a second bus bar.
Figure 8:
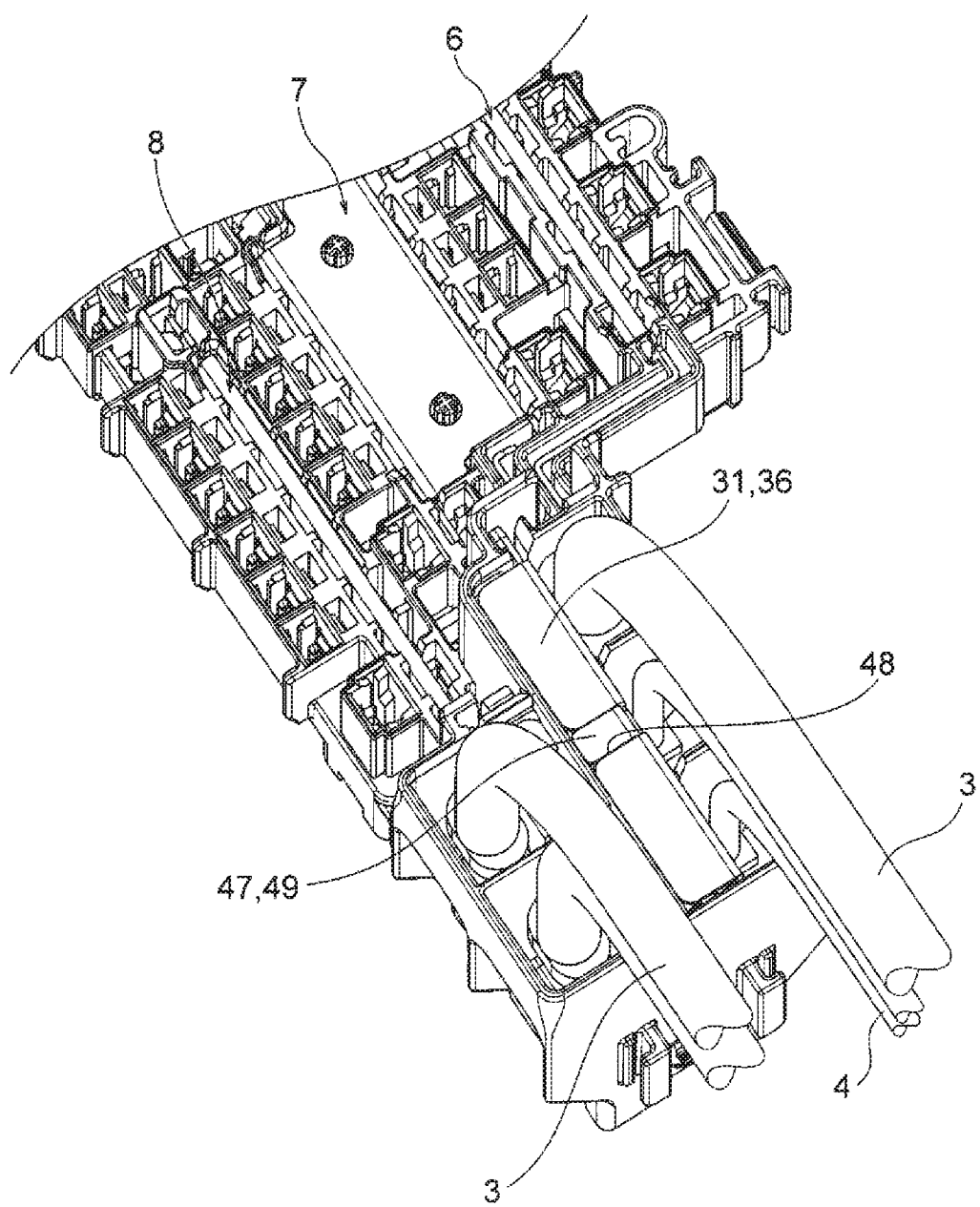
FIG. 8 is a perspective view corresponding to FIG. 7.
Figure 9:
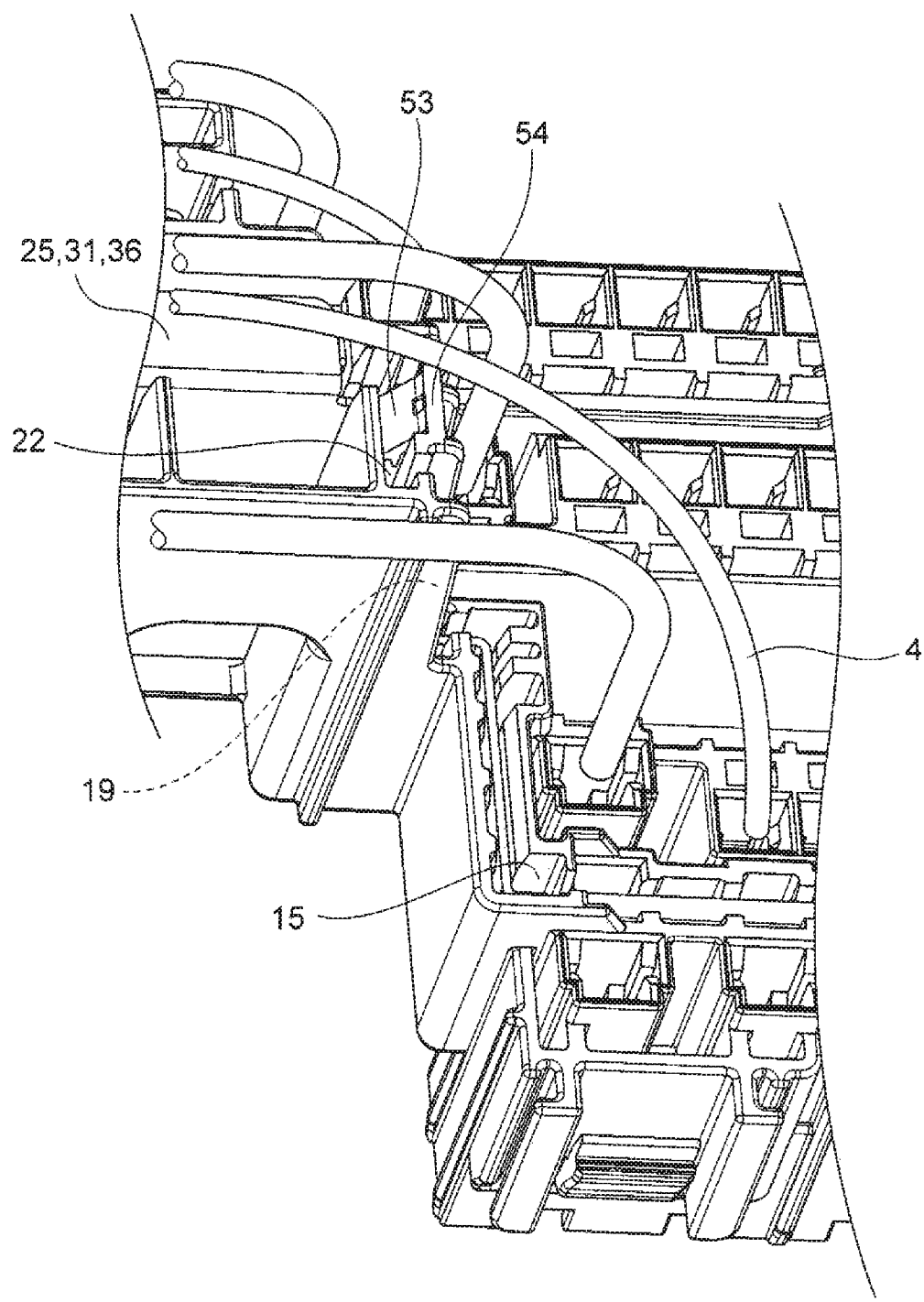
FIG. 9 is a perspective view (a perspective view as viewed from the bottom side) of an electronic component block showing a modification of a bus bar assembling portion.

An embodiment will be described below with reference to the drawings. FIG. 1 is a perspective view (a perspective view as viewed from a bottom side) showing an embodiment of an electronic component block having a bus bar assembling structure according to the present invention. FIG. 2 is an exploded perspective view of a configuration in FIG. 1. FIG. 3 is an exploded perspective view of configurations of a block main body, a first bus bar and a second bus bar. FIG. 4 is a perspective view showing a state in which the first bus bar and the second bus bar having the configurations in FIG. 3 are assembled to the block main body. FIG. 5 is a perspective view showing main portions of the first bus bar and the second bus bar. FIG. 6 is a perspective view showing the first bus bar and the second bus bar before assembling. FIG. 7 is a bottom view of an electronic component block showing a modification of a first bus bar and a second bus bar. FIG. 8 is a perspective view corresponding to FIG. 7. FIG. 9 is a perspective view (a perspective view as viewed from the bottom side) of an electronic component block showing a modification of a bus bar assembling portion. In addition, arrows in FIGS. 1 to 4 denote an upper-lower direction.

<Configuration of Electrical Connection Box 1>

In FIG. 1, an electrical connection box 1 is mounted on a truck in a state of being exposed to outside (which is an example). Specifically, the electrical connection box 1 is mounted between a cabin and a loading platform of the truck (which is an example). Such an electrical connection box 1 is configured to include an electronic component block 2 and a housing that accommodates the electronic component block 2. The electrical connection box 1 is disposed at a terminal of a wire harness. The terminal of the wire harness includes thick wires 3 and thin wires 4 drawn from a lower portion of the electrical connection box 1. The wire harness is routed at a predetermined position of the automobile with the electrical connection box.

<Electronic Component Block 2>

In FIGS. 1 to 3, plural types of electronic component blocks are assembled to the housing of the electrical connection box 1. One of the plural types of electronic component blocks is the electronic component block 2. The electronic component block 2 is provided in the electrical connection box 1 as a member to which a plurality of electronic components (for example, fuses or fusible links) is electrically attached. The electronic component block 2 is provided as a member in which the electronic components are connected to a predetermined circuit. The electronic component block 2 is configured to include a block main body 5, a first bus bar 6, a second bus bar 7 and a third bus bar 8. The electronic component block 2 is formed such that the first bus bar 6 and the second bus bar 7 can be collectively assembled to the block main body 5. Since a characteristic portion of the present invention is not on a third bus bar 8 side, description of the third bus bar 8 will be omitted. The electronic component block 2 as described above is of a cassette type, and is detachably assembled to the housing. Regarding the electronic component block 2, these names may be replaced with a cassette block 2.

<Block Main Body 5>

In FIGS. 1 to 4, the block main body 5 is a resin molded article having insulating property. Cavities (reference numerals omitted) for the plurality of electronic components (not shown) are formed in the block main body 5. Three bus bar assembling portions 9 to 11 are formed in the block main body 5. The three bus bar assembling portions 9 to 11 are disposed and formed on a lower surface side of the block main body 5. The bus bar assembling portion 9 among the three bus bar assembling portions 9 to 11 is formed as an assembling portion of the first bus bar 6. The bus bar assembling portion 10 is formed as an assembling portion of the second bus bar 7. The bus bar assembling portion 11 is formed as an assembling portion of the third bus bar 8. Hereinafter, the bus bar assembling portions 9 and 10 will be described in more detail.

<Bus Bar Assembling Portion 9>

In FIGS. 1 to 4, the bus bar assembling portion 9 is formed as the assembling portion of the first bus bar 6 as described above. Such a bus bar assembling portion 9 is formed in an illustrated shape, and includes a first assembling portion 12, a second assembling portion 13 continuous with the first assembling portion 12, a third assembling portion 14, and a bus bar accommodating groove 15 connecting the second assembling portion 13 and the third assembling portion 14. The first assembling portion 12 is formed as an assembling portion of a first electrical connection portion 23 described below of the first bus bar 6. A holding portion 16 for the first electrical connection portion 23 is formed to protrude from the first assembling portion 12. The second assembling portion 13 is formed as an assembling portion of a second electrical connection portion 24 described below of the first bus bar 6. The third assembling portion 14 is disposed and formed on a connection side of the thick wires 3 and the thin wires 4. The third assembling portion 14 is formed as an assembling portion of a third electrical connection portion 25 described below of the first bus bar 6. The third assembling portion 14 is disposed and formed at the same position as a second assembling portion 18 described below of the bus bar assembling portion 10. The bus bar accommodating groove 15 is formed as an assembling portion of a bus bar main body 26 described below of the first bus bar 6. The bus bar accommodating groove 15 will be described below.

<Bus Bar Assembling Portion 10>

In FIGS. 1 to 4, the bus bar assembling portion 10 is formed as the assembling portion of the second bus bar 7 as described above. Such a bus bar assembling portion 10 is formed in an illustrated shape, and includes a first assembling portion 17, the second assembling portion 18, and a bus bar accommodating groove 19 connecting the first assembling portion 17 and the second assembling portion 18. The first assembling portion 17 is formed as an assembling portion of a first electrical connection portion 37 described below of the second bus bar 7. A holding portion 20 for the first electrical connection portion 37 is formed to protrude from the first assembling portion 17. The second assembling portion 18 is disposed and formed on the connection side of the thick wires 3 and the thin wires 4. The second assembling portion 18 is formed as an assembling portion of a second electrical connection portion 38 described below of the second bus bar 7. The bus bar accommodating groove 19 is formed as an assembling portion of a bus bar main body 39 described below of the second bus bar 7. The bus bar accommodating groove 19 will be described below.

<Bus Bar Accommodating Groove 15 and Bus Bar Accommodating Groove 19>

In FIGS. 2 to 4, the bus bar accommodating groove 15 and the bus bar accommodating groove 19 are formed in a groove shape as viewed from the lower surface side of the block main body 5. The bus bar accommodating groove 15 and the bus bar accommodating groove 19 are formed in the groove shape having a groove bottom, a groove opening and a groove side wall without any particular reference numeral. The bus bar accommodating groove 15 and the bus bar accommodating groove 19 are formed in an illustrated shape, and respectively include a groove shallow portion 21 and a groove deep portion 22. The groove deep portion 22 is formed wide so as to be a common portion of the bus bar accommodating groove 15 and the bus bar accommodating groove 19.

<First Bus Bar 6>

In FIGS. 2 to 6, the first bus bar 6 is formed by pressing a conductive metal plate. The first bus bar 6 is formed in an illustrated shape, and includes the first electrical connection portion 23, the second electrical connection portion 24 continuous with the first electrical connection portion 23, the third electrical connection portion 25, and the bus bar main body 26 connecting the second electrical connection portion 24 and the third electrical connection portion 25. A pushed surface 27 that is pushed when being accommodated to the bus bar assembling portion 9 is formed in the first electrical connection portion 23. A held hole 28 into which the holding portion 16 of the bus bar assembling portion 9 is inserted is formed in a portion where the pushed surface 27 is provided. The pushed surface 27 is a flat surface that is pushed by a surface pushing jig (not shown) described below. A pushed surface 29 that is flush with the pushed surface 27 of the first electrical connection portion 23 is formed in the second electrical connection portion 24. The pushed surface 29 is also a flat surface that is pushed by the surface pushing jig (not shown) described below. The bus bar main body 26 is formed in a strip shape. The bus bar main body 26 is formed in a shape bent several times by 90 degrees in a longitudinal direction.

The third electrical connection portion 25 is formed in a plate-shaped portion wider than the bus bar main body 26. A main body 30 and a first pushing portion 31 are formed in the third electrical connection portion 25. Three through holes 33 are formed on a side of one side portion 32 of the main body 30. The through hole 33 is formed for inserting a bolt (not shown) used for connecting the thick wires 3 and the thin wires 4. The first pushing portion 31 is coupled to the other side portion 34 of the main body 30. The first pushing portion 31 is formed of a strip-shaped bent piece extending along the other side portion 34. The first pushing portion 31 is formed by bending by 90 degrees. A through hole 35 is formed in such a first pushing portion 31. The through hole 35 is formed in a portion of the second bus bar 7 with respect to a second pushing portion 44 described below. The through hole 35 is formed so as to be opened smaller than a wire diameter of the thick wire 3. In addition, the through hole 35 is formed in accordance with arrangement of the thick wires 3 (in the present embodiment, since a thick wire 3 is provided between two thin wires 4, the through hole 35 is disposed and formed at an intermediate position of the other side portion 34). An outer surface of the first pushing portion 31 is formed as a pushed surface 36. Similarly to the pushed surfaces 27 and 29, the pushed surface 36 is formed as a flat surface that is pushed when being accommodated to the bus bar assembling portion 9. That is, a surface that is pushed by the surface pushing jig (not shown) described below is formed. Since the first pushing portion 31 has a strip shape extending along the other side portion 34 as described above, heat dissipation can be enhanced by increasing the surface area. The first pushing portion 31 is also effective as a heat dissipating portion in addition to a portion used for accommodating to the bus bar assembling portion 9.

<Second Bus Bar 7>

In FIGS. 2 to 6, the second bus bar 7 is formed by pressing a metal plate having the same conductivity as the first bus bar 6. The second bus bar 7 is formed in an illustrated shape, and includes the first electrical connection portion 37, the second electrical connection portion 38, and the bus bar main body 39 connecting the first electrical connection portion 37 and the second electrical connection portion 38. A pushed surface 40 that is pushed when being accommodated to the bus bar assembling portion 10 is formed in the first electrical connection portion 37. A held hole 41 into which the holding portion 20 of the bus bar assembling portion 10 is inserted is formed in a portion where the pushed surface 40 is provided. The pushed surface 40 is a flat surface that is pushed by the surface pushing jig (not shown) described below. The bus bar main body 39 is formed in a shape bent several times by 90 degrees in the longitudinal direction.

The second electrical connection portion 38 is formed in a plate-shaped portion wider than the bus bar main body 39. A main body 42, bent pieces 43 and the second pushing portion 44 are formed in the second electrical connection portion 38. Three through holes 46 and three bent pieces 43 are formed on a side of one side portion 45 of the main body 42. The through hole 46 is formed for inserting a bolt (not shown) used for connecting the thick wires 3 and the thin wires 4. The second pushing portion 44 is formed in a narrow protruding piece shape. The second pushing portion 44 is inserted into the through hole 35 of the first pushing portion 31 in the first bus bar 6. A protruding tip end of the second pushing portion 44 is formed in alignment with a position of the pushed surface 36 of the first pushing portion 31. The protruding tip end of the second pushing portion 44 has a small area, and is formed as a pushed surface (reference numeral omitted) that is pushed when being accommodated to the bus bar assembling portion 10.

As described above, the second pushing portion 44 is formed in the narrow protruding piece shape, but as shown in FIGS. 7 and 8, the second pushing portion 44 may be formed into a narrow bent piece, and may be used as a second pushing portion 47. In this case, a notch 48 is formed in the first pushing portion 31 of the first bus bar 6. The second pushing portion 47 is formed so as to extend along an extending direction of the notch 48. A pushed surface 49 that is flush with the pushed surface 36 of the first pushing portion 31 is formed in the second pushing portion 47.

<Assembling of Electrical Component Block 2>

In FIG. 3, first, the first bus bar 6 and the second bus bar 7 are assembled such that the main body 30 of the third electrical connection portion 25 in the first bus bar 6 and the main body 42 of the second electrical connection portion 38 in the second bus bar 7 are overlapped with each other. Next, when the first bus bar 6 and the second bus bar 7 are collectively pushed into the bus bar assembling portions 9 and 10 of the block main body 5 as shown in FIG. 4, assembling of the first bus bar 6 and the second bus bar 7 is completed. The surface pushing jig (not shown) is used during the collective pushing of the first bus bar 6 and the second bus bar 7. The surface pushing jig (not shown) is configured to simultaneously push the pushed surface 27 of the first electrical connection portion 23, the pushed surface 29 of the second electrical connection portion 24 and the pushed surface 36 of the first pushing portion 31 of the third electrical connecting portion 25 in the first bus bar 6, as well as the pushed surface 40 of the first electrical connection portion 37 and the protruding tip end of the second pushing portion 44 of the second electrical connection portion 38 (or the pushed surface 49 of the second pushing portion 47) in the second bus bar 7. Therefore, the workability is higher than assembling the first bus bar 6 and the second bus bar 7 one by one. The collective pushing of the first bus bar 6 and the second bus bar 7 is characterized by a structure of the first pushing portion 31 and the second pushing portion 44. This characteristic structure will be referred to as a bus bar assembling structure 50.

<Effects>

As described above with reference to FIGS. 1 to 8, according to the bus bar assembling structure 50 of the embodiment of the present invention, the first bus bar 6 and the second bus bar 7 can be collectively assembled to the bus bar assembling portions 9 and 10 of the block main body 5, so that the workability can be improved compared with the example in related art. According to the electrical connection box 1 or the wire harness of the embodiment of the present invention, a better product can be provided due to the bus bar assembling structure 50 having the above effect.

<Other Structures>

A plurality of thick wires 3 and thin wires 4 are shown in the present embodiment, but in reality, many thinner wires (not shown) are also drawn from the electronic component block 2. In order to protect the thin wires, arrangement of slits 51 and 52 as shown in FIG. 7 is effective. That is, since the slits 51 and 52 are formed in the bus bar assembling portion 11 serving as the assembling portion of the third bus bar 8, and arrangement thereof is not aligned on a straight line but shifted, the thin wires are difficult to enter. Therefore, wire protection during assembling is effective.

As shown in FIG. 9, formation of a bus bar locking portion 53 is also effective for wire protection. That is, the bus bar locking portion 53 is formed in a wall 54 (a groove side wall) of a groove deep portion 22 of the bus bar accommodating groove 15 and the bus bar accommodating groove 19 so as to protrude inward of the tip end. The bus bar locking portion 53 in FIG. 9 is formed as a portion that prevents the thin wires from entering. The formation of the bus bar locking portion 53 is effective for wire protection during assembling.

It goes without saying that the present invention can be variously modified without departing from the spirit of the present invention.

What is claimed is:

1. A bus bar assembling structure comprising:
   a resin block main body for an electronic component block;
   a first bus bar; and
   a second bus bar,
   wherein the resin block main body includes a bus bar assembling portion;
   wherein the first bus bar and the second bus bar are accommodated in the bus bar assembling portion;
   wherein the first bus bar has a first pushing portion that is pushed when the first bus bar is accommodated in the bus bar assembling portion, the first pushing portion being a bent piece;
   wherein the first pushing portion has a through hole or a notch; and
   wherein the second bus bar has a second pushing portion that is inserted into the through hole or the notch and is disposed at a position corresponding to a position of a pushed surface of the first pushing portion.

2. The bus bar assembling structure according to claim 1, wherein the first pushing portion is formed in a strip plate shape extending along a longitudinal direction of the first bus bar.

3. The bus bar assembling structure according to claim 1, wherein the first pushing portion is the notch, and the second pushing portion is formed in a shape of a narrow bent piece extending along an extending direction of the notch.

4. An electrical connection box comprising:
   an electronic component block that includes the bus bar assembling structure according to claim 1; and
   a housing that accommodates the electronic component block.

5. A wire harness comprising:
   a wire harness body whose end portion is connected to the electrical connection box according to claim 4,
   wherein the wire harness body is routed in an automobile.

* * * * *